United States Patent [19]

Warner

[11] 4,088,870
[45] May 9, 1978

[54] PORTABLE ELECTRICAL SPACE HEATER

[76] Inventor: Lawrence L. Warner, 804 NE. "D" St., Grants Pass, Oreg. 97526

[21] Appl. No.: 719,569

[22] Filed: Sep. 1, 1976

[51] Int. Cl.$^2$ .......................... H05B 3/00; F24H 3/04
[52] U.S. Cl. ..................................... 219/367; 165/122; 219/364; 219/368; 219/370; 219/376
[58] Field of Search ................................ 219/364–371, 219/374–376, 381, 382, 359, 363, 342; 237/16–18; 165/122, 126

[56] References Cited

U.S. PATENT DOCUMENTS

| 1,995,673 | 3/1935 | Evans | 219/374 X |
|---|---|---|---|
| 2,471,784 | 5/1949 | Seifner | 219/364 UX |
| 2,492,774 | 12/1949 | Wild | 219/364 |
| 2,645,704 | 7/1953 | Petersen et al. | 219/376 X |
| 2,697,164 | 12/1954 | Knapp et al. | 219/374 X |
| 2,722,594 | 11/1955 | Kueser | 219/368 |
| 2,843,718 | 7/1958 | Huck | 219/368 |
| 3,180,972 | 4/1965 | Covault | 219/365 |

FOREIGN PATENT DOCUMENTS 253,458  7/1964  Australia .............................. 219/368

*Primary Examiner*—A. Bartis
*Attorney, Agent, or Firm*—Clarence M. Crews

[57] ABSTRACT

A portable, electrical space heater adapted to be placed and turned on in any enclosure where a suitable source of electrical energy is available. The heater is characterized by an open framework in which an electric fan is contained, and a surmounting, partially enclosed electrical heating unit. Air drawn in by the fan is delivered upward to an enclosed side of the heating unit. The heating unit comprises a series of spaced, generally horizontal plates of progressively increasing breadth from the bottom plate to the top one, each plate having spaced, downwardly inclined front and rear margins. Electrical heating units interposed between adjacent plates are suitably connected to a common source of electrical energy. The air delivered upward by the fan is distributed laterally to the plates, is intercepted and delivered forward past the heater units by the rear progressively projecting downturned margins of the plates, and is diverted downward by the front, desirably aligned, downturned margins of the plates, being thereby delivered toward the floor which will generally be the coldest part of the room or enclosure. The fan is thermostatically cut off as the temperature falls and turned on as the temperature rises. The generation of heat is automatically interrupted as long as the room temperature remains at a comfortably warm set level.

6 Claims, 5 Drawing Figures

U.S. Patent    May 9, 1978    4,088,870
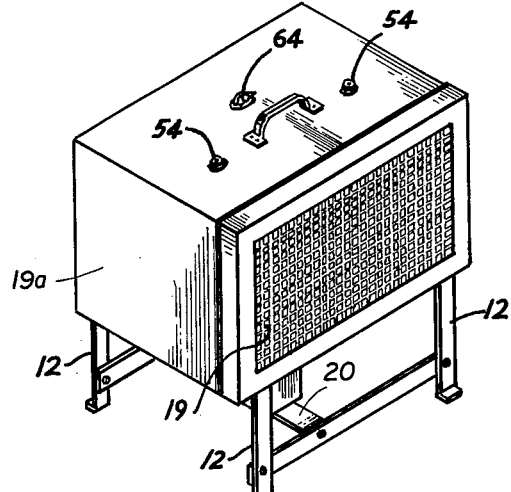
Fig. 1
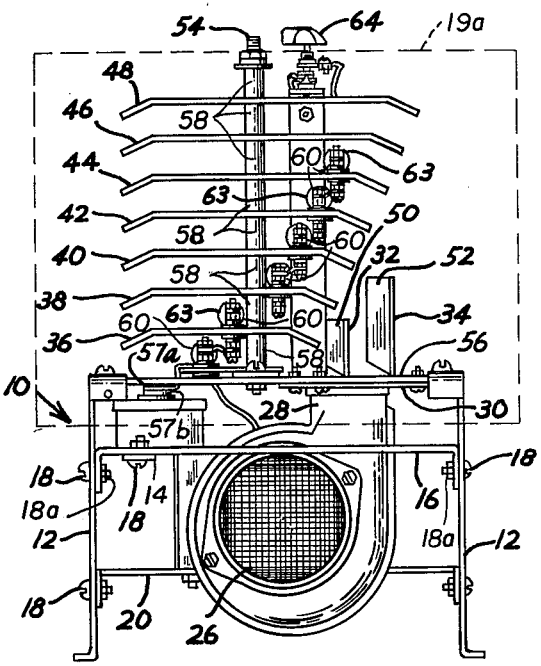
Fig. 2
Fig. 3
Fig. 4
Fig. 5

PORTABLE ELECTRICAL SPACE HEATER

This invention relates to a novel, portable electric heater adapted for use in any enclosed space which can be heated with advantage.

The invention is characterized by the provision of an electric fan which draws air from the space to be heated and delivers it upward to a group of electrical heaters. A series of spaced plates, generally horizontally disposed, of progressively increasing area from bottom to top, and having downturned front and rear margins, divide the fan-propelled air into separate paths, each of the several paths having its own distinct electrical heater, and each designed to discharge the heated air downward toward the coolest part of the space to be heated.

A removable protective housing is provided for the heat generating and distributing structure. The housing has solid walls on the top, back and both sides, a screened front end, and is wide open at the bottom. The housing provides protection for children and others who, without such protection, might touch the electric heater units. When properly secured in place, however, it serves as a carrier for the entire device, and also as a means for insuring that all of the fanpropelled air will be discharged in a forward direction through the screened wall.

It is a feature that the fan is thermostatically controlled, being automatically turned on when a heat sensitive unit senses that the plates have attained a predetermined temperature and automatically turned off when the plates fall below that temperature. Through thermostatic means, the generation of heat is interrupted so long as the room is maintained at a chosen temperature.

Other objects and advantages will hereinafter appear.

In the drawing forming part of this specification,

FIG. 1 is a perspective view of a complete heater illustrative of the invention;

FIG. 2 is a view in side elevation of the heater with the housing removed, the view being on a larger scale than FIG. 1;

FIG. 3 is a view in rear elevation of the structure shown in FIG. 2;

FIG. 4 is a diagrammatic view showing how the fan is rendered active only after a predetermined temperature has been attained; and FIG. 5 is a plan view of a heat transfer unit through which a fan motor is controlled.

An open skeletonized framework 10 is provided which comprises four corner posts 12, longitudinal braces 14, and cross-braces 16, the braces 14 and 16 being rigidly united by screws 18 and nuts 18a to provide a firm and rigid removable support for an enclosure 19a, which includes solid top, bottom, side and rear walls and a removable front screen wall 19.

A cross-brace 20 provides support for a fan motor 22 which drives a fan 24. The fan 24 draws in air through a screen 26 and discharges it upwardly through a throat 28. The throat 28 is surrounded by a wide flange 30 of support plate 56. Vertical plates 32 and 34 are mounted upon the plate 56, the plate 32 tending to confine a portion of the fan-impelled air to several vertically spaced horizontal lower plates 36, 38, 40 and the plate 34 tending to confine another portion of the air to vertically spaced horizontal upper plates 42, 44, 46 and 48.

In front of plates 32 and 34 are divergent pairs of plates 50–50 and 52–52 which spread the air streams laterally. The plates 36, 38, 40, 42, 44, 46 and 48 are mounted on upright stems 54 which extend upward from a horizontal supporting plate 56, the plate 56 being fixedly supported by the frame 10. Spacer sleeves 58 are interposed between each pair of adjacent plates. The throat 28 of fan 24 registers with an opening in plate 56.

As is plainly evident in FIG. 2, each of the horizontal plates 36, 38, 40, 42, 44, 46 and 48 has downwardly sloping rear margins and downwardly sloping front margins, the rear margins serving to intercept the upwardly traveling air from fan 28 to direct it forwardly toward the front screen wall 18, and the front margins serving to intercept the forwardly traveling air and direct it downwardly through screen wall 19 toward the floor of the room.

Between each pair of adjacent plates, with the exception of the two uppermost plates 46 and 48, and between plate 36 and plate 56 there is interposed an electrical heating element 60, preferably of the coil type. As shown in FIG. 4, the several heating units 60 are connected in series are connected one another and with any suitable source of electrical energy through a plug 62 or the equivalent. The heating units are carried by insulators 63.

When the plug 62 is plugged in to a suitable source of electrical energy, all the heater units may be energized simultaneously by the setting of an adjustable thermostat 66 through a handle 64.

The device is plugged into a suitable source of electrical energy with the manually operable thermostatic switch 66 set in an active position by a handle 64. Current is furnished to the switch 66 through a conductor 67 and is returned through the several heating units 60 connected in series with the thermostat 66 and with one another, by a conductor 69. At one extreme setting of thermostatic switch handle 64 no current will reach the heating elements or the fan because the switch 66 will stand open. As the handle 64 is adjusted toward the opposite extreme setting the thermostatic switch is closed and the cut-off temperature will be raised as the bimetallic switch member 66a of switch 66 is engaged and mechanically deformed by adjustment of handle 64 and the delivered air will be progressively warmer. It is accordingly a simple matter to so adjust the control handle 64 that the cut-off temperatures of the enclosure will be maintained at a comfortable, adjusted temperature level.

The lowermost heating element 60 is surrounded by a heavy heat conductive copper coil 57 which has an intermediate downwardly and laterally offset platform portion 57a. The platform portion serves as a heat transmitter for rendering active a normally idle thermostatic switch 57b in response to the heat generated by the lowermost heating element 60. The switch 57b forms part of a normally open circuit through which, when in a closed condition, the fan motor 22 may be energized. The fan motor normally stands idle while the device 57 is warming up thermostatic switch 57b. When the switch 57b has been sufficiently warmed up to close the fan motor circuit, the fan motor goes into action. The fan motor circuit may be traced from one terminal of the plug 62 through the conductors 67 and 65, motor 22, conductor 57c, fan thermostatic switch 57b, 57a and conductor 69 to the second terminal of the plug 62.

Provision is made for circulating air through the heating apparatus only so long as the fan controlling thermostat 57a–57b exceeds a predetermined critical temperature, but for cutting off the circulation of the air by stopping the fan motor whenever that thermostat falls below the critical temperature.

The generation of heat is automatically suspended whenever the room temperature attains the cut-off temperature for which the room thermostatic switch 66 is set.

It will be observed that the plates 36–48 are progressively wider from bottom to top. The front edges of the plates are desirably located in a common vertical plane, but the rear edge of each plate other than the lowermost one projects farther to the rear than the rear edge of its underlying neighbor. In consequence, the air flow past the several heating elements is substantially equalized.

I have described what I believe to be the best embodiment of my invention. What I desire to cover by letters patent, however, is set forth in the appended claims.

I claim:

1. A portable, electrical space heater comprising, in combination,
    (a) an electric fan having an upwardly directed discharge throat, a casing having an open bottom, closed top, side and rear walls and a screened front air discharge, the discharge throat of the fan being arranged to deliver air into only the rear portion of the casing,
    (b) a series of generally horizontal, vertically spaced air deflecting plates of progressively increasing front to rear width within the casing from bottom to top, the front margins of said plates terminating rearwardly of said front screened air discharge, each overlying plate having its rear margin disposed to project rearwardly beyond the rear margin of its underlying neighbor and shaped to intercept a portion of the rising air stream from said discharge throat and deflect it forward for flow between adjacent plates toward said screened front air discharge,
    (c) a group of electrical heating elements distributed at successive levels between different adjacent pairs of plates and positioned in the air flow path therebetween, and
    (d) common thermostatic control means for concurrently adjusting the heating level of said elements, the rear margin of each plate being inclined downward to divert a portion of the rising stream of air forward and the forward margin of each plate being inclined downward to divert forwardly traveling air downward for discharge through said front screened air discharge in a direction downwardly toward the floor.

2. A portable electrical space heater as set forth in claim 1 in which the forward margins of the plates terminate in a common vertical plane.

3. A portable electrical space heater as set forth in claim 1 in which a V-shaped air spreader is disposed in position to stand above said fan discharge throat in the way of the rising air stream generated by the fan and to distribute the air laterally within the casing.

4. A portable electrical space heater as set forth in claim 1 in which an open, skeletonized framework supports and surrounds the fan and, the fan motor, and supports the deflecting plates, the heating units and the casing, the casing being conveniently removable in its entirety to afford access to the heating units and to the deflecting plates.

5. A portable electric space heater as set forth in claim 4 which the screened front air discharge is formed by a wall on the casing which is conveniently removable from the remainder of the casing.

6. A portable electric space heater as set forth in claim 1 in which the uppermost pair of adjacent plates has no interposed heating unit so that a portion of the fan-propelled air is passed therebetween without substantial heating under all operating conditions.

* * * * *

UNITED STATES PATENT OFFICE
CERTIFICATE OF CORRECTION

Patent No. 4,088,870　　　　　　　　　Dated　May 9, 1978

Inventor(s) Lawrence L. Warner

It is certified that error appears in the above-identified patent and that said Letters Patent are hereby corrected as shown below:

Claim 5, line 2, before "which" insert the word --in--.

Signed and Sealed this

Third Day of October 1978

[SEAL]

Attest:

RUTH C. MASON
Attesting Officer

DONALD W. BANNER
Commissioner of Patents and Trademarks